(12) United States Patent
Louison et al.

(10) Patent No.: US 11,992,800 B2
(45) Date of Patent: May 28, 2024

(54) ARCHED AIR FILTER

(71) Applicant: Cummins Filtration Inc., Nashville, TN (US)

(72) Inventors: Matthew Louison, McFarland, WI (US); Scott Schwartz, Cottage Grove, WI (US); Jeremiah Cupery, Madison, WI (US); Mark Adams, Madison, WI (US)

(73) Assignee: Cummins Filtration Inc., Nashville, TN (US)

( * ) Notice: Subject to any disclaimer, the term of this patent is extended or adjusted under 35 U.S.C. 154(b) by 0 days.

(21) Appl. No.: 18/037,845

(22) PCT Filed: Nov. 23, 2021

(86) PCT No.: PCT/US2021/060503
§ 371 (c)(1),
(2) Date: May 19, 2023

(87) PCT Pub. No.: WO2022/115423
PCT Pub. Date: Jun. 2, 2022

(65) Prior Publication Data
US 2023/0390687 A1    Dec. 7, 2023

Related U.S. Application Data

(60) Provisional application No. 63/117,743, filed on Nov. 24, 2020.

(51) Int. Cl.
*B01D 46/10* (2006.01)
*B01D 46/52* (2006.01)
*F02M 35/024* (2006.01)

(52) U.S. Cl.
CPC ......... *B01D 46/521* (2013.01); *B01D 46/103* (2013.01); *F02M 35/02416* (2013.01);
(Continued)

(58) Field of Classification Search
CPC ................ B01D 46/103; B01D 46/521; B01D 2275/208; B01D 2279/60; F02M 35/02416; F02M 35/0245; F02M 35/02483
(Continued)

(56) References Cited

U.S. PATENT DOCUMENTS 4,343,149 A * 8/1982 Abthoff ................. F01N 3/0226
55/529
5,730,766 A    3/1998 Clements
(Continued)

FOREIGN PATENT DOCUMENTS

| AU | 2014201109 | 3/2014 |
| CN | 202538551 U | 11/2012 |

(Continued)

OTHER PUBLICATIONS

International Search Report and Written Opinion issued for PCT Application No. PCT/US2021/060503 dated Mar. 18, 2022, 12 pages.
(Continued)

*Primary Examiner* — Minh Chau T Pham
(74) *Attorney, Agent, or Firm* — Foley & Lardner LLP (57) ABSTRACT

A filtration system includes an air cleaner housing and a filter element. The air cleaner housing includes a base and a removable cover. At least one of the base or the cover defines a cavity and a protrusion extending into the cavity. The filter element is disposed within the cavity. The filter element includes a plurality of media blocks each including a pleated filter media. The plurality of media blocks are arranged in arch shapes of approximately equal inner radii. The plurality of media blocks are coupled to each other along opposing edges that extend along a pleat direction of the pleated filter media. The media blocks together define at least one void
(Continued)

that extends along the protrusion. The protrusion occupies a portion of the void.

21 Claims, 11 Drawing Sheets (52) U.S. Cl.
CPC .. *F02M 35/0245* (2013.01); *F02M 35/02483* (2013.01); *B01D 2275/208* (2013.01); *B01D 2279/60* (2013.01)

(58) Field of Classification Search
USPC ...... 55/385.3, 529, 497, 498, 502, 378, 482; 123/198 E
See application file for complete search history.

(56) References Cited

U.S. PATENT DOCUMENTS

| | | | |
|---|---|---|---|
| 5,820,646 A | 10/1998 | Gillingham et al. | |
| 5,858,039 A * | 1/1999 | Schumann | B01D 46/08 55/378 |
| 5,893,939 A | 4/1999 | Rakocy et al. | |
| 6,572,667 B1 | 6/2003 | Greif et al. | |
| D499,177 S | 11/2004 | Kosmider et al. | |
| 7,008,467 B2 | 3/2006 | Krisko et al. | |
| 7,282,077 B2 | 10/2007 | Honisch et al. | |
| 7,332,009 B2 | 2/2008 | Casey et al. | |
| 7,491,254 B2 | 2/2009 | Krisko et al. | |
| 7,520,913 B2 * | 4/2009 | Mills | B01D 46/0036 55/482 |
| 7,645,313 B2 * | 1/2010 | Lampert | B01D 46/24 55/482 |
| 7,900,316 B2 | 3/2011 | Fester et al. | |
| 7,942,947 B2 * | 5/2011 | Yamamoto | B01D 46/521 55/497 |
| 8,097,061 B2 | 1/2012 | Smith et al. | |
| 8,187,352 B2 * | 5/2012 | Schumann | B01D 46/06 55/378 |
| 8,197,570 B2 | 6/2012 | Morgan | |
| 8,246,702 B2 | 8/2012 | Ackermann et al. | |
| 8,551,205 B2 | 10/2013 | Berisha et al. | |
| 8,753,415 B2 | 6/2014 | Coulonvaux et al. | |
| 8,920,529 B2 | 12/2014 | Disson et al. | |
| 8,961,634 B2 | 2/2015 | Boyce | |
| 8,979,964 B2 | 3/2015 | Muenkel et al. | |
| 9,205,361 B2 * | 12/2015 | Menssen | B01D 46/106 |
| 9,221,003 B2 * | 12/2015 | Schumann | B01D 46/06 |
| 9,320,997 B2 | 4/2016 | Campbell et al. | |
| 9,334,770 B2 | 5/2016 | Pettersson | |
| 9,457,308 B2 | 10/2016 | Kaufmann et al. | |
| 9,630,134 B2 | 4/2017 | Raether | |
| 9,744,493 B2 | 8/2017 | Legare et al. | |
| 9,844,744 B2 * | 12/2017 | Gensler | F02M 35/0245 |
| 9,873,073 B2 | 1/2018 | Enderich et al. | |
| 10,035,093 B2 * | 7/2018 | Worrall | B01D 46/521 |
| 10,252,205 B2 | 4/2019 | Tomlin et al. | |
| 10,302,050 B2 | 5/2019 | Sorger et al. | |
| 10,307,029 B2 * | 6/2019 | Sharpley | A47L 9/12 |
| 10,436,155 B2 | 10/2019 | Pereira Madeira et al. | |
| 10,610,815 B2 | 4/2020 | Burton et al. | |
| 2005/0039601 A1 | 2/2005 | Kosmider et al. | |
| 2005/0161387 A1 | 7/2005 | Van de Graaf et al. | |
| 2008/0047240 A1 | 2/2008 | Trautmann et al. | |
| 2011/0067368 A1 | 3/2011 | Handley et al. | |
| 2018/0021716 A1 | 1/2018 | Li et al. | |
| 2018/0036665 A1 | 2/2018 | Fritzsching et al. | |
| 2019/0111373 A1 | 4/2019 | Hilliard | |
| 2019/0344206 A1 | 11/2019 | Stark et al. | |
| 2020/0164299 A1 | 5/2020 | Louison et al. | |

FOREIGN PATENT DOCUMENTS

| | | |
|---|---|---|
| CN | 207413024 U | 5/2018 |
| CN | 109072827 A | 12/2018 |
| CN | 110167655 A | 8/2019 |
| CN | 110523151 A | 12/2019 |
| DE | 10 2014 001 539 A1 | 8/2014 |
| DE | 10 2014 006 852 A1 | 12/2014 |
| DE | 10 2016 002 248 A1 | 12/2016 |
| DE | 10 2013 007 868 B4 | 4/2017 |
| EP | 0 713 421 B1 | 8/1998 |
| EP | 1 302 726 A1 | 4/2003 |
| EP | 0 923 975 B1 | 5/2003 |
| EP | 1 458 459 B9 | 7/2008 |
| EP | 1 216 743 B1 | 3/2011 |
| EP | 2 571 596 A1 | 3/2013 |
| EP | 2 254 679 B1 | 11/2014 |
| EP | 2 760 562 B1 | 6/2015 |
| EP | 3 093 058 A1 | 11/2016 |
| EP | 3 525 910 A1 | 8/2019 |
| EP | 3 085 428 B1 | 3/2020 |
| EP | 3 013 456 B1 | 4/2020 |
| EP | 3 237 089 B1 | 5/2020 |
| EP | 3 664 915 A1 | 6/2020 |
| GB | 0 891 853 A | 3/1962 |
| WO | WO-2007/090011 A2 | 8/2007 |
| WO | WO-2014/202158 A1 | 12/2014 |
| WO | WO-2018/191147 A1 | 10/2018 |

OTHER PUBLICATIONS

First Office Action issued for Chinese Patent Application No. 2021800774528 Nov. 9, 2023, 8 pages.

* cited by examiner

ARCHED AIR FILTER

CROSS-REFERENCE TO RELATED PATENT APPLICATIONS

The present application is a National Phase of PCT/US2021/060503, filed Nov. 23, 2021, which claims the benefit of and priority to U.S. Provisional Patent Application No. 63/117,743, filed Nov. 24, 2020. The contents of these applications are incorporated by reference in its entirety.

TECHNICAL FIELD

The present application relates generally to air filtration systems for internal combustion engine systems.

BACKGROUND

Internal combustion engine systems generate power from a fuel and air mixture. The air entering the engine system may be contaminated with dirt, dust, and other abrasive particulate matter, which may damage various parts of the engine system if not removed. To remove particulate contaminants, the air entering the engine is generally passed through a filter assembly, which may include a particulate filter.

SUMMARY

One embodiment of the present disclosure relates to a filtration system. The filtration system includes an air cleaner housing and a filter element. The air cleaner housing includes a base and a removable cover. At least one of the base or the cover defines a cavity and a protrusion extending into the cavity. The filter element is disposed within the cavity. The filter element includes a plurality of media blocks each including a pleated filter media. The plurality of media blocks are arranged in arch shapes of approximately equal inner radii. The plurality of media blocks are coupled to each other along opposing edges that extend along a pleat direction of the filter media. The media blocks together define at least one void that extends along the protrusion. The protrusion occupies a portion of the void.

Another embodiment of the present disclosure relates to a filter element. The filter element includes a plurality of media blocks, a first end cap, and a second end cap. The plurality of media blocks each include a pleated filter media. The plurality of media blocks are arranged in arch shapes of approximately equal inner radii. The plurality of media blocks are coupled to each other along opposing edges to form gaps between adjacent media blocks. The first end cap is coupled to a first end of each one of the plurality of media blocks and the second end cap is coupled to a second end of each one of the plurality of media blocks.

Yet another embodiment of the present disclosure relates to a filter element. The filter element includes a media pack and a first end cap. The first end cap is coupled to a first end of the media pack. The first end cap includes an opening and a seal member circumscribing the opening. The seal member includes a first set of surfaces defining a first set of arches, and a second set of surfaces defining a second set of arches having a smaller radius than the first set of arches.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Embodiments described herein relate generally to air filtration systems. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engine systems require a clean source of fresh air to power the engine. Unfiltered air may include dirt and other solid contaminants that can damage cylinder walls, pistons, and other engine components. In order to protect the engine, internal combustion engine systems include an air filtration system which filters the air to remove any solid materials before passing the air to the engine. The filtration system may include an air cleaner housing and a filter element (e.g., cartridge, etc.). In operation, the filtration system directs the air through the filter element which includes a filter media that captures any solid particulate from the inlet air. The performance of the filtration system depends on, among other factors, the structure of the filter element and the materials used to construct the filter element (e.g., the materials used to produce a filter media for the filter element, the specifications of the filter media pack such as the flow area of the filter media pack, the pleat depth of the filter media pack, and other factors).

Air filtration systems are often modified to fit within a limited space envelope near the internal combustion engine. The air filtration system may be selected after other various other engine components have been positioned within the available space, leaving regions of non-uniform cross section that are difficult to accommodate with existing, off-the-shelf air cleaner housing designs. What areas remain often have rectangular-shaped cross sections with long and short sides. As a result, many traditional air cleaner housing designs—which are typically round (e.g., circular)—under-utilize the available space.

As an alternative to traditional round and/or square air filtration system designs, an oval-shaped or racetrack-shaped construction may be used that includes an oval-shaped or racetrack-shaped pleated filter media block. Due to the larger aspect ratio of the media block, an oval-shaped or racetrack-shaped design may utilize a greater proportion of the available space; however, the geometry of the media block in such designs limits the performance of the air filtration system. In particular, the change in curvature at each end of an oval-shaped or racetrack-shaped media block may cause non-uniform pleat spacing along the perimeter of the media block. On the long sides of the media block, the pleat gaps on the inner and outer portions of the filter element are nearly identical. However, on the shorter, curved sides of the media block, the inner pleat spacing is greatly reduced relative to the outer pleat spacing (due to the difference in arc length at the inner and outer sides). This variation in pleat spacing causes inconsistent dust loading in different areas of oval-shaped or racetrack-shaped media blocks.

Yet another alternative to traditional round and/or square air filtration system designs is to use a filter element construction that does not include a pleated media block. For example, the air filtration system could include an inline flow filter element made from stacked sheets of corrugated media with upstream and downstream channels. This type of filter element can be adjusted to fit within the available packing space but is often more expensive than traditional pleated media designs due to (1) additional adhesive material quantities that are required during production and (2) slower manufacturing times associated with the layering of materials and adhesive material application. Another limitation of a corrugated media block construction is that the flow must pass in a single direction through the media block (e.g., from a front face to an opposing back face) which can make installing or removing a filter element in the air cleaner housing difficult.

In addition to the issues described above, the filter element designs in many existing air filtration systems can be replaced with non-genuine filter elements; for example, in order to reduce maintenance costs. However, the filtration performance of these non-genuine filter elements can be much lower than an original equipment manufacturer (OEM) filter element. Over time, operating with the non-genuine filter element may result in damage to the cylinder walls, pistons, and/or other parts of the engine, thereby leading to a reduction in engine performance.

Implementations herein relate to air filtration systems including a unique pleated filter element geometry that can accommodate irregularly shaped packaging spaces without sacrificing filtration performance. The filter element includes a pleated filter media block with pleats running in an axial direction toward an outlet of the filtration system. Specifically, the filter element includes two arched pleated media blocks that intersect to form a lenticular-shaped interior space. The pleated media blocks are coupled at either end to form two large gaps. The resulting filter element has uniform pleat spacing in all but the two pleat gaps. Among other benefits, maintaining a consistent pleat spacing between the outer (e.g., dirty) and inner (e.g., clean) sides of the filter element ensures a more uniform loading of dirt along a perimeter of the media block and a greater effective (e.g., usable) media area. The filter element therefore requires less media than comparably sized oval-shaped filter elements.

In one embodiment, the air cleaner housing is designed to match the shape formed by the pleated media block so as to provide approximately uniform spacing between the housing and the media, which can, advantageously, restrict the use of non-matching, non-genuine filter elements.

II. Example Air Filtration System

Figure 1:
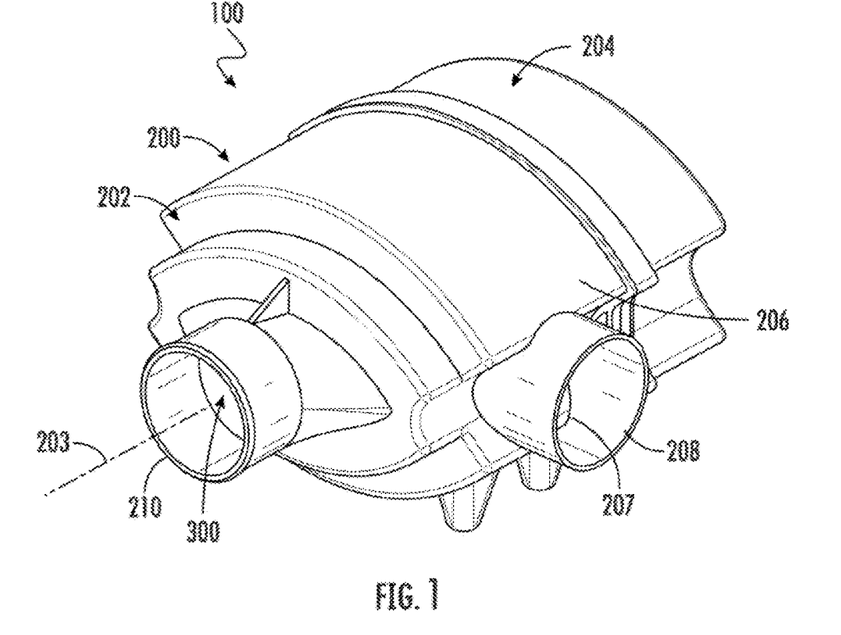
FIG. 1 is a front perspective view of a first example air filtration system.

FIG. 1 is a perspective view of a first example filtration system 100. The filtration system 100 is an air filtration system (e.g., air cleaner, etc.) that is used to filter air entering an internal combustion engine, to prevent dust particles, bugs, soot, dirt, and other contaminants from entering the internal combustion engine. The filtration system 100 includes an air cleaner housing, shown as housing 200, and a filter element 300 that is removably coupled to the housing 200 such that the filter element 300 may be removed from the housing 200. The housing 200 is structured to direct the flow of air through the filter element 300 and to facilitate maintenance of the filter element 300. The housing 200 includes a base 202 and a cover 204 removably (e.g., detachably, etc.) coupled to the base 202. The cover 204 provides access to the filter element 300 and facilitates removal of the filter element 300 from the base 202 during maintenance events.

As shown in FIG. 1, the base 202 includes an outer wall 206 that extends along an axial direction to form a cavity 207. The cavity 207 is sized to receive at least a portion of the filter element 300 therein (e.g., a first end of the filter element 300, an outlet end of the filter element 300, etc.). The base also includes flow ports including an inlet port 208 and an outlet port 210. The inlet port 208 is structured to receive fresh air and to direct the air toward the filter element 300. The inlet port 208 is a flow conduit that extends radially away from a central axis 203 of the base 202. The outlet port 210 is structured to direct clean, filtered air away from the filter element 300 and toward the internal combustion engine. The outlet port 210 is a flow conduit that extends axially away from a closed end of the base 202. In other embodiments, the position of the inlet port 208 and outlet port 210 along the base 202 may be different. For example, in one embodiment the inlet port 208 may be disposed on the cover 204.

The cover 204 engages the base 202 at an open end of the cavity 207 that is opposite from the outlet port 210. The cover 204 may be coupled to the base 202 using clips, bolts, screws, or another suitable fastener. Similar to the base 202, the cover 204 includes an outer wall defining an internal cavity that is sized to receive a portion of the filter element 300 therein (e.g., a second end of the filter element 300, etc.). Together, the cover 204 and the base 202 enclose the filter element 300.

Figure 2:
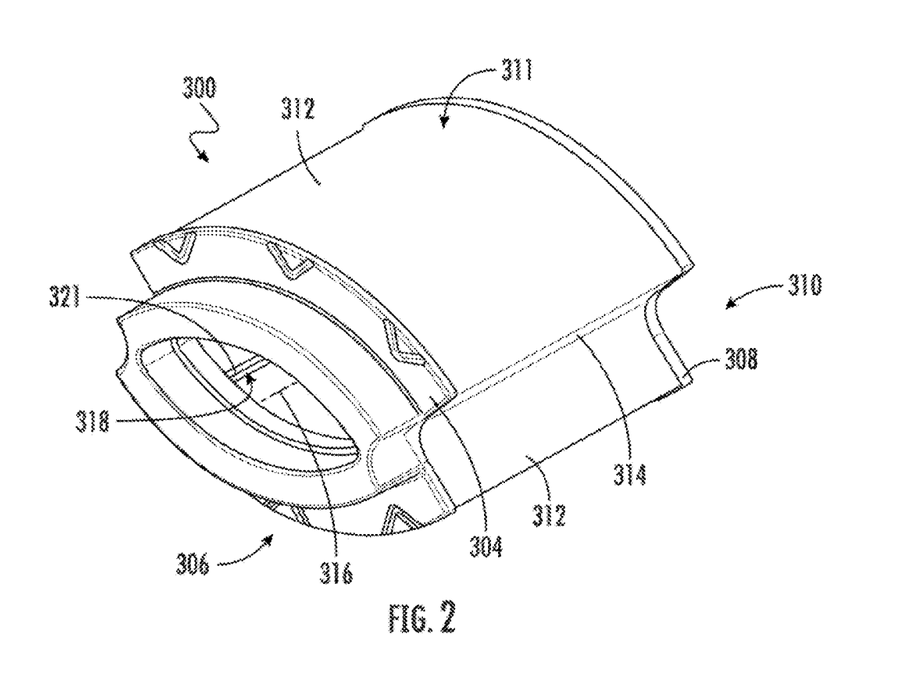
FIG. 2 is a front perspective view of an filter element for the air filtration system of FIG. 1.

FIG. 2 shows a perspective view of a first example filter element 300 for the filtration system 100 of FIG. 1. The filter element 300 is an air filter element for the filtration system 100 that separates dirt and other contaminants from the incoming air. The filter element 300 is sized and shaped to be received within the housing 200 (see FIG. 1) (e.g., within an enclosed volume defined by the cover 204 and the base 202) and is removably coupled to the housing 200. As shown in FIG. 2, the filter element 300 is a replaceable filter cartridge that may be replaced periodically as the filter element 300 loads with dust and other contaminants. The filter element 300 includes a media pack 311, a first end cap 304 disposed at a first end 306 of the media pack 311, and a second end cap 308 disposed at a second end 310 of the media pack 311 opposite from the first end 306, and a support member 318 extending between the first end cap 304 and the second end cap 308.

The filter element 300 of FIG. 2 includes a media pack 311 formed from a plurality of filter media blocks, shown as media blocks 312. Each of the media blocks 312 includes a pleated filter media, shown as filter media 314, that is pleated by folding the filter media 314 back and forth in an alternating fashion (e.g., in an accordion-style arrangement). The pleats form substantially "V" shaped grooves in the filter media 314 and increase the overall surface area of the media without altering the flow area upstream of the filter media. The arrangement of the filter media 314 (e.g., the number of pleats, the pleat depth, etc.) alters the particle removal efficiency of the filter media block. The filter media 314 is structured to filter particulate matter and/or other contaminants from a fluid flowing therethrough so as to produce a filtered fluid (e.g., a clean fluid, air, etc.). The filter media 314 may include a paper-based filter media, a fiber-based filter media, a foam-based filter media, or the like. The filter element 300 may be arranged as an outside-in flow filter element having an outer dirty side and an inner clean side. In an alternative arrangement, the filter element 300 is an inside-out flow filter element having an inner dirty side and an outer clean side. Fluid to be filtered passes from the dirty side of the filter element 300 to the clean side of the filter element 300. In the embodiment of FIG. 2, the filter element 300 is a radial flow filter element in which flow passes in a substantially radial direction through the media pack 311 (with respect to a central axis 316 of the filter element 300). In another embodiment, the media pack 311 may be arranged such that flow passes in an at least partially axial direction (e.g., a longitudinal direction parallel to the central axis 316 of the filter element 300).

As used herein, the term "media pack" refers to the overall filter media structure for the filter element 300. The term "media block" refers to individual pleated segments of filter media that together form the media pack. In one embodiment, each media block has an approximately uniform pleat spacing (e.g., a uniform gap size/width between adjacent pleats) across the media block without any abrupt changes in pleat spacing. Each media block may be formed from separate panels (e.g., sections, etc.) of media. In another embodiment, multiple media blocks may be formed from a single continuous panel (e.g., sheet, web, etc.) of media by folding the media panel back on itself at an intermediate position (e.g., between pleats, in the corners where adjacent media blocks meet) along the media (e.g., so that a spacing between pleats in a single location along the media panel is greater than a pleat spacing at other locations along the media panel). Among other benefits, forming multiple media blocks from a single continuous media panel reduces manufacturing time and complexity, and ensures a more reliable seal between adjacent media blocks.

Figure 3:
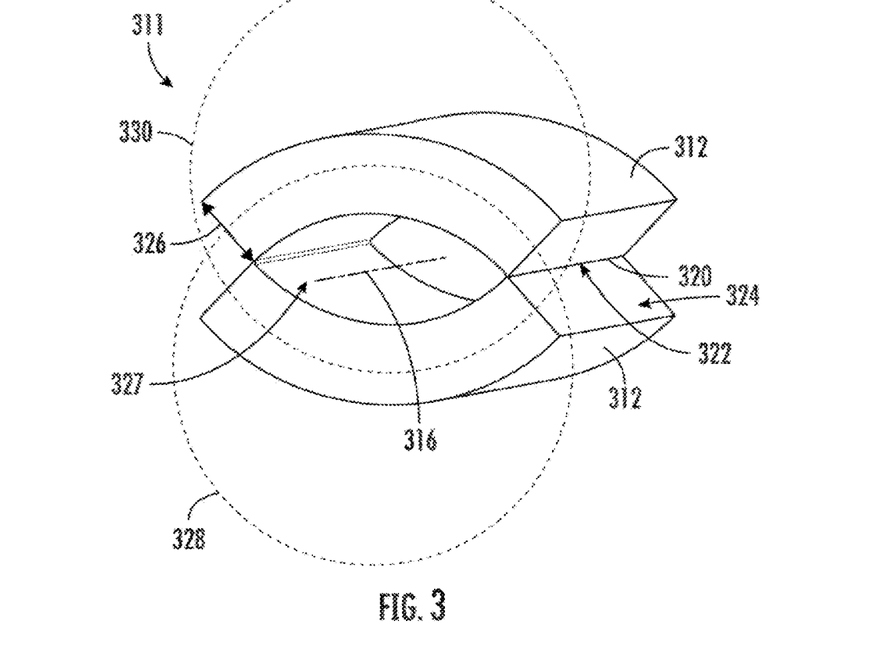
FIG. 3 is a perspective view of a media block for the filter element of FIG. 2.

FIG. 3 shows the filter media pack (e.g., media pack 311) isolated from the filter element 300. The pleats for the media pack 311 extend in a pleat direction (e.g., an axial direction), substantially parallel to the central axis 316 of the filter element 300 (e.g., between the first end cap 304 and the second end cap 308). The media pack 311 includes a plurality of media blocks 312 that are coupled to one another at opposing edges, along a connecting line 320 that extends axially along the media pack 311, along the pleat direction of each media block 312 (e.g., substantially parallel to the pleat direction, substantially parallel to the fold lines between adjacent pleats, etc.). This arrangement prevents deformation and/or collapse of the pleats which can occur due to bending in a direction that is perpendicular to the fold lines between pleats. The connecting line 320 may be coincident with a folded pleat tip 322 (e.g., a fold between pleats) as shown in FIG. 3. The connection between each adjacent media block 312 forms a gap 324 (e.g., pleat gap, spacing, separation distance, etc.) that is larger than an average pleat spacing across each of the plurality of media blocks 312 (e.g., a pleat spacing that is greater than an average distance between adjacent pleat tips within each media block 312). In the embodiment of FIG. 3, each gap 324 forms a substantially "V" shaped void that extends parallel to the central axis 316 of the media pack 311. An angle of pleat separation at the gap 324 between media blocks 312 will vary depending on the number of media blocks 312 in the media pack 311 and the radius of curvature of each media block 312. As described above, the construction of the media pack 311 shown in FIG. 3 can be formed from a single pleated media panel by folding the media panel back onto itself at a fold between adjacent pleats and seaming together the outside edges (e.g., free edges) of the media panel. In such an implementation, the media pack 311 is continuous along one end so that the media does not include any breaks or separation at the one end. Among other benefits, this construction reduces manufacturing complexity and ensures a more robust seal along the intersection between adjacent media blocks 312. In another embodiment, the media pack 311 can be formed from two separate media panels that are seamed together at opposing edges of each media panel.

As shown in FIG. 3, each side and/or face of the media block 312 is curved (e.g., non-planar in shape). In particular, the media blocks 312 are arched into a convex shape that bows radially away from a central axis of the media pack 311 (e.g., an axis that extends substantially parallel to the pleat direction, substantially parallel to the fold lines between adjacent pleats, etc.). Beneficially, the convex shape and/or arrangement of the media blocks 312 in FIG. 3 improve strength under radial loading in an outside-in flow arrangement. The convex shape and/or arrangement of the media blocks 312 also provides a larger pleat pack surface with larger diameter on an upstream side (e.g., dirty side) of the media pack 311, where the pleats have greater pleat spacing with a larger volume between pleats to hold more dust and particulate matter.

In the embodiment of FIG. 3, the media blocks 312 are arranged in arch shapes of approximately equal inner and outer radii. In other words, the curvature of each of the media blocks 312 is approximately the same. However, in other embodiments, the curvature of at least one media block 312 may be different from the other media blocks. In the embodiment of FIG. 3, each media block 312 is wrapped about an axis that extends substantially parallel to the pleat direction (e.g., substantially parallel to the fold lines between adjacent pleats). The first end cap 304 and the second end cap 308 are substantially rigid such that the shape of each media block 312 is maintained. Various examples of differently shaped, non-planar media blocks (e.g., pleat blocks, etc.) are provided in PCT Application No. PCT/US2018/026671, filed Apr. 9, 2018, which is hereby incorporated by reference herein in its entirety.

In the embodiment of FIG. 3, the media pack 311 is formed from two identical media blocks, shown as media blocks 312 that have the same pleat depth 326 and pleat spacing (e.g., number of pleats). In other words, the media pack 311 is symmetrical across a reference plane passing between the media blocks 312 (e.g., passing through the connecting lines 320 on opposing edges of each media block 312) and along the central axis 316 of the media pack 311. Among other benefits, this arrangement ensures uniform pleat spacing and media area between the upper and lower media blocks 312. Moreover, the media blocks 312 are not tangent to one another and have a large inner and outer radii to reduce the variation in pleat spacing between the clean and dirty sides of the media pack 311, which promotes flow uniformity across the depth of each pleat.

In the embodiment of FIG. 3, the media pack 311 includes two media blocks 312 that are coupled to each other along opposing edges to form an enclosed volume 327 having an approximately lenticular-shaped (e.g., lens-shaped) cross-section. In particular, the media blocks 312 intersect to form a vesica piscis-shaped cross-section, in such a way that a center of a first circle 330 defined by the lower media block lies on a perimeter of a second circle 328 defined by the upper media block.

Figure 4:
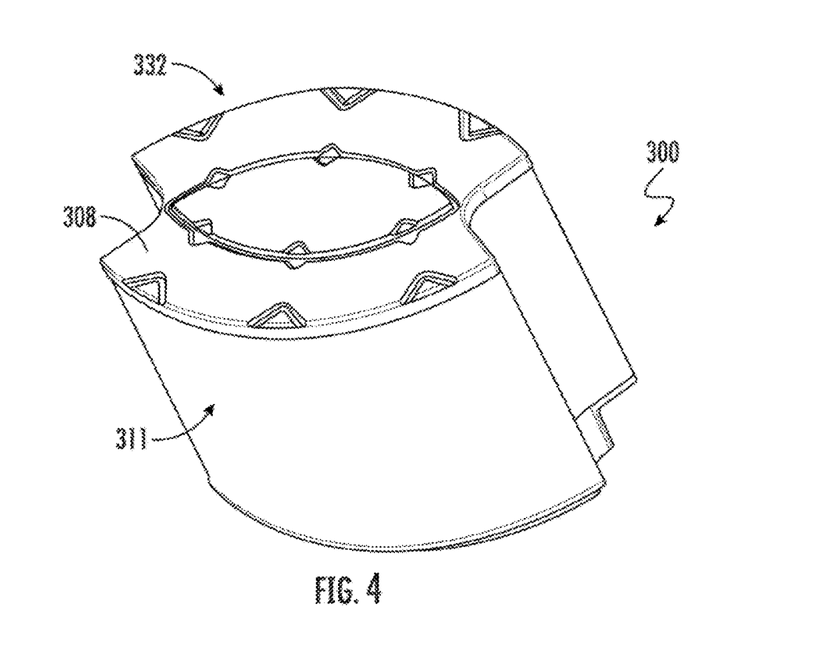
FIG. 4 is a front view of the filter element of FIG. 2.

FIG. 4 shows a perspective view of a closed end 332 of the filter element 300. The second end cap 308 is coupled to the media pack 311 at the closed end 332 and covers the enclosed volume 327 (see FIG. 3) to prevent flow therethrough. A shape of the second end cap 308 (e.g., a shape defined by an outer perimeter of the second end cap 308) matches the profile of an axial end of the media pack 311. The second end cap 308 may extend axially into the media pack 311 and may cover a portion of the clean and dirty sides of the media pack 311 at the closed end 332. The second end cap 308 may be formed from a urethane material (e.g., curable urethane), or another suitable plastic.

Figure 5:
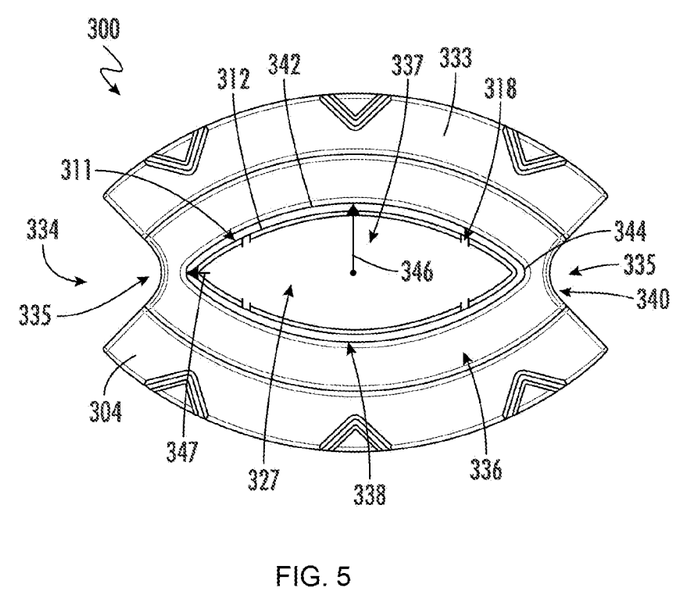
FIG. 5 is a rear perspective view of the filter element of FIG. 2.

FIG. 5 shows a perspective view of an open end 334 of the filter element 300 that is opposite from the closed end 332. The first end cap 304 is coupled to the media pack 311 at the open end 334 of the media pack 311. The first end cap 304 is structured to sealingly engage with the base 202 of the housing 200 (see also FIG. 1) to prevent flow bypass between the clean and dirty sides of the filter element 300 and to direct clean, filtered air from the filter element 300 to the outlet port 210 in the housing 200. Similar to the second end cap 308, a shape of the first end cap 304 (e.g., a shape defined by an outer perimeter of the first end cap 304) matches the profile of an axial end of the media pack 311 (and the second end cap 308). The first end cap 304 may extend into the axial end of the media pack 311 and may cover a portion of the clean and dirty sides of the media pack 311 at the open end 334. The first end cap 304 may be formed from a urethane material (e.g., curable urethane), or another suitable plastic. Together, the media pack 311, the first end cap 304, and the second end cap 308 define a void 335 (e.g., a channel, etc.) that extends axially between opposing ends of the filter element 300, along an entire axial length of the filter element 300. In the embodiment of FIG. the filter element 300 includes two voids 335 at opposing sides of the filter element 300.

As shown in FIG. 5, the first end cap 304 includes a base 333 and a seal member 336 that defines a sealing surface 338 for the filter element 300. The seal member 336 is structured to sealingly engage with the housing 200 (see FIG. 1). The seal member 336 extends axially away from the base 333 and the media pack 311 (see also FIG. 2) and includes cutouts 340 at opposing sides that are aligned (e.g., axially) with the pleat gaps 324 (e.g., voids 335) between adjacent media blocks 312 in the media pack 311. As shown in FIG. 5, the seal member 336 defines a lenticular-shaped opening 337 that substantially matches the cross-sectional shape of the enclosed volume 327, thereby reducing the pressure drop across the open end 334. The sealing surface 338 defines two arches 342 (e.g., a first set of arches) mirrored across a reference plane between the two media blocks 312. As such, the arches 342 have an approximately equal radius. In one embodiment, as shown in FIG. 5, the radius of the arches 342 is larger than the inner radius of the media pack 311 so that the arches 342 are disposed at an intermediate radial position between the inner and outer perimeter of the media pack 311. Among other benefits, this arrangement provides space to accommodate an axial flange of the air cleaner housing or another seal member of the air cleaner housing without substantially restricting flow from the clean side of the filter element 300 through the open end 334. Connecting these two arches 342, proximate to an intersection between two adjacent media blocks 312 (e.g., at corners formed between the adjacent media blocks 312) are two sealing surfaces 344 (e.g., a second set of arches) having a smaller radius than the arches 342. In one embodiment, a ratio of a radius 346 of the arches 342 over a radius 347 of the sealing surfaces 344 is within a range between 5 and 100. Variation of the radius ratio can be used to prevent the use of improper or incompatible filter elements in the filtration system.

As shown in FIGS. 2 and 5, the filter element 300 also includes a support member 318 engaged with an inner perimeter of the media pack 311. The support member 318 is structured to improve the strength of the filter element 300 under compressive loading (e.g., due to an air pressure differential across the media pack 311). In the embodiment of FIG. 2, the support member 318 is a centertube cage element 321 that includes a plurality of axially extending strips and circumferential support rings. The strips and/or support rings engage with an inner perimeter of the media pack 311 to limit radial deformation of the media pack 311. The structure of the support member 318 may differ in various example embodiments.

Figure 6:
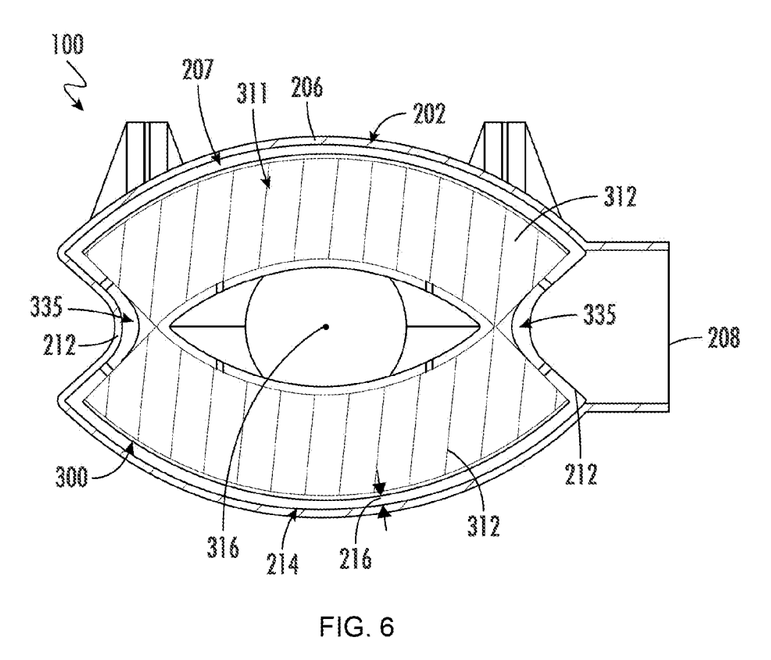
FIG. 6 is a front cross-sectional view of the air filtration system of FIG. 1.

FIG. 6 shows a front cross-sectional view of the filtration system 100. The base 202 includes outer walls 206 that curve outward from the central axis 316 of the filter element 300 and/or cavity 207. The base 202 also includes a protrusion 212 extending radially into the cavity 207. In one embodiment, the protrusion 212 is formed by an indentation in the outer wall 206 of the base 202. In another embodiment, the protrusion 212 is formed by an insert that extends axially along the inner surface of the outer wall 206. As shown in FIG. 6, the protrusion 212 occupies and is contoured to match the shape of at least a portion of the void 335 between adjacent media blocks 312. In the embodiment of FIG. 6, the base 202 includes two protrusions 212 on opposing sides of the housing 200 to support the filter element 300 at each void 335 (e.g., the sides of each media block 312). The cover 204 (see FIG. 1) also includes protrusions on either side of the housing that correspond with the protrusions 212 in the base 202. As such, the outer walls of the housing 200 are contoured to substantially match the profile of the filter element 300. This housing geometry results in an approximately uniform spacing between the outside edges of the filter element 300 and the interior surfaces 214 of the housing 200, which provides structural support for the filter element 300 and prevents the use of non-genuine filter element cartridges that will interfere with the protrusion 212. In one embodiment, a distance 216 between the filter element 300 and the interior surfaces 214 of the housing 200 is less than half of a pleat depth of the media pack 311. Amount other benefits, this arrangement ensures sufficient clearance for airflow between the filter element 300 and the housing 200 without substantially limiting the structural support provided by the housing 200 to the media pack 311.

As shown in FIG. 6, the inlet port 208 of the housing 200 is disposed adjacent to one of the voids 335 in the filter element 300 (e.g., along one of the indentations in the outer wall 206) and extends radially outward from the outer wall 206 of the base 202. As such, fresh air entering the housing 200 is directed by the inlet port 208 toward the void 335 in the filter element 300 and in a circumferential direction through the gap between the filter element 300 and the interior surfaces 214 of the housing 200.

Figure 7:
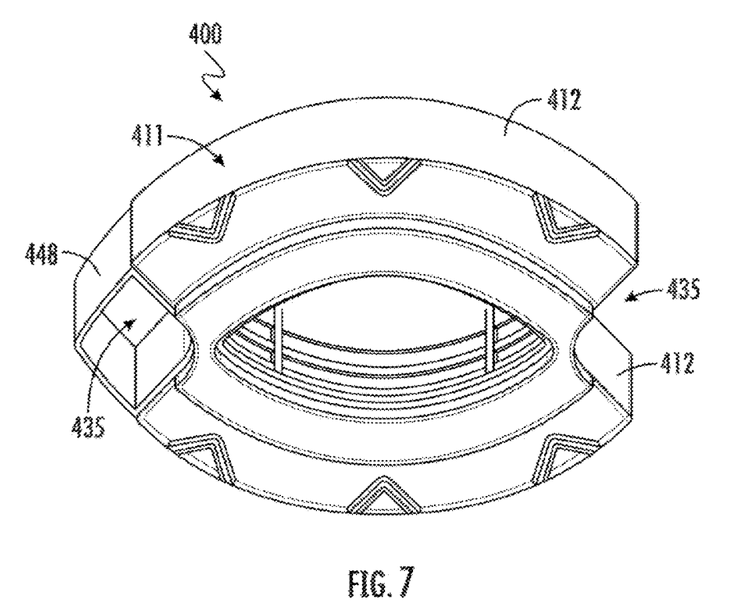
FIG. 7 is a front view of a second example filter element for an air filtration system.

The design of the filtration system 100 described with references to FIGS. 1-6 should not be considered limiting. It will be appreciated that various alternatives and combinations are possible without departing from the inventive concepts disclosed herein. For example, FIG. 7 shows a perspective view of a second example filter element 400 that is structured to reduce pressure drop across the filtration system. The filter element 400 has a similar construction to the filter element 300 described with reference to FIGS. 1-6 but also includes a flow deflector 448 to direct incoming air away from the voids 435. As shown in FIG. 7, the flow deflector 448 is disposed within one of the voids 435 defined by the filter element 400, in between adjacent media blocks 412 of the filter element 400. During installation, the filter element 400 is arranged within the air cleaner housing so that the flow deflector 448 is adjacent to and immediately downstream from the inlet port. Among other benefits, the flow deflector 448 smooths the transition between the inlet port and the arched gaps between the filter element 400 and the interior surfaces of the housing cavity. In the embodiment of FIG. 7, the flow deflector 448 is a hollow tube having a rectangular-shaped cross-section. In another embodiment, the flow deflector 448 is a "V" or "U" shaped extension that substantially covers the void 435 in the filter element 400. In yet another embodiment, the flow deflector 448 is a flat plat that covers the "V" shaped channel formed by the void 435. In some embodiments, the flow deflector 448 only extends along a portion of the void 435 that is axially aligned with the inlet port. The flow deflector 448 may be glued to the filter element (e.g., media pack 411), secured between end caps, or otherwise coupled to the filter element 400.

Figure 8:
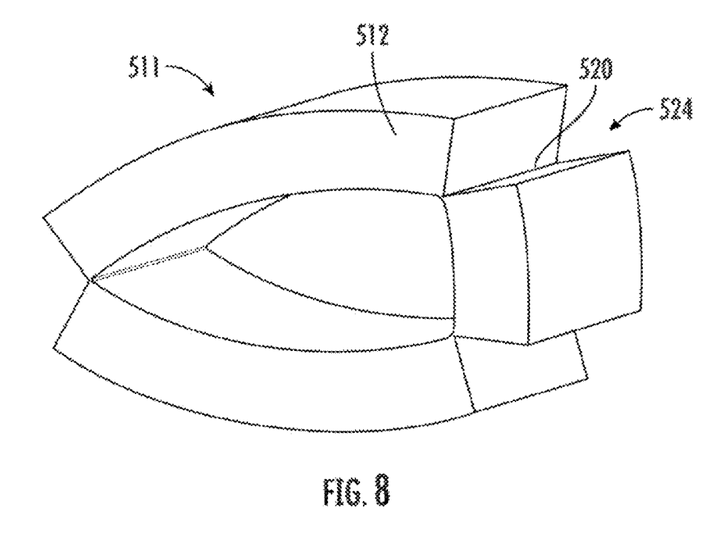
FIG. 8 is a perspective view of a second example media block for a filter element.

The design of the media pack used in the filter element may also differ in various example embodiments. For example, the number of media blocks used to form the media pack may be greater than that shown in FIG. 3. For example, FIG. 8 shows a perspective view of a second example media pack 511 that is formed from three media blocks 512. The media blocks 512 are arranged in arched shapes of approximately equal inner and outer radii. A size (e.g., width along a circumferential direction, etc.) of one of the media blocks 512 (e.g., a third media block) is different from (e.g., less than) a size of the other two media blocks 512. In other embodiments, the size of all three media blocks 512 may be different. In yet other embodiments, the size of all three media blocks 512 may be the same. The media blocks 512 are coupled to one another at opposing edges, along connecting lines 520 that extend axially along the media pack 511 (in three different locations around the perimeter of the media pack 511). The connection between each adjacent media block 512 forms a gap 524 (e.g., a pleat gap) that is larger than an average pleat spacing across each of the three media blocks 512. As with the media pack 311 described with reference to FIG. 3, the media pack 511 of FIG. 8 may be formed from a single pleated media panel, by folding the media panel back onto itself at a fold between adjacent pleats and seaming together the free edges of the media panel. In another embodiment, the media pack 511 can be formed from two or more separate media panels that are seamed together at opposing ends of each media panel. Among other benefits, the additional media block 512 can be used to vary the height of the filter element to fit within different packaging spaces, without changing the inner or outer radius of each media block 512.

Figure 9:
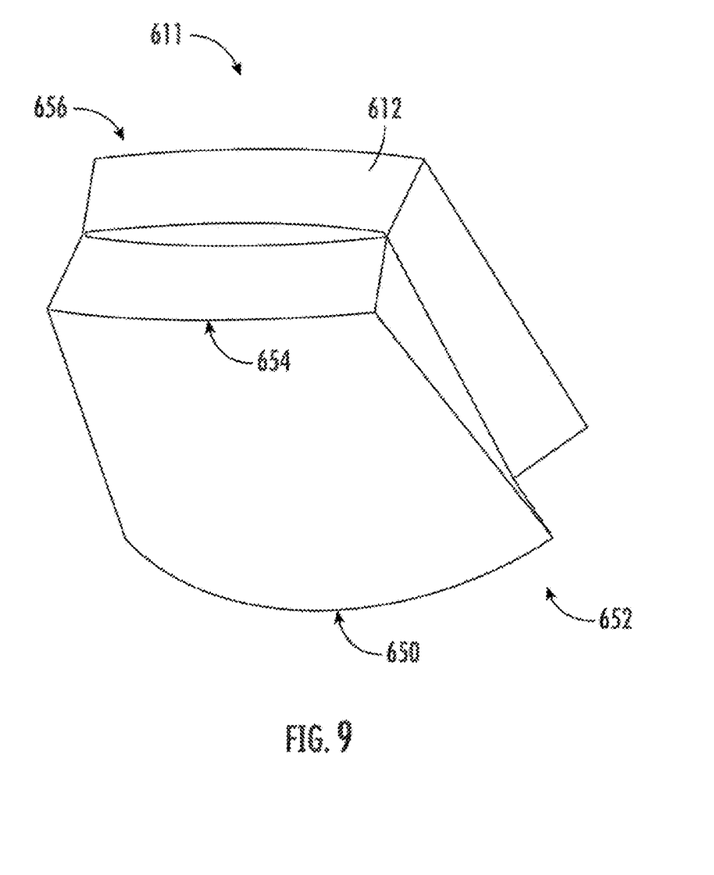
FIG. 9 is a perspective view of a third example media block for a filter element.

FIG. 9 is a perspective view of a third example media pack 611. The media pack 611 is structured to direct flow through the media pack 611 in an axial direction. The media pack 611 has a non-uniform outer radius at opposing axial ends of the media pack 611. In particular, each media block 612 of the media pack 611 transitions from a first outer radius 650 at a first axial end 652 of the media pack 611 to a second outer radius 654 at a second axial end 656 of the media pack 611 that is larger than the first outer radius 650. An inner radius of each media block 612 is approximately equal at opposing axial ends of the media pack 611. In the embodiment of FIG. 9, each media block 612 has an approximately constant pleat depth, such that the effective flow area (e.g., inside area) at the first axial end 652 of the media pack 611 (having a smaller outer radius than the second axial end 656) is less than the effective flow area at the second axial end 656 of the media pack 611. The reduced cross-sectional area at the second axial end 656 makes it better suited for the inlet side of the housing (e.g., the second axial end 656 of the media pack 611 is more restrictive than the first axial end 652, which promotes flow distribution toward the second axial end 656). The second axial end 656 is also more compact than the first axial end 652 making it well-suited for an axial end inlet housing configuration in which the inlet port directs into the housing in an axial direction from an axial end of the housing.

Figure 10:
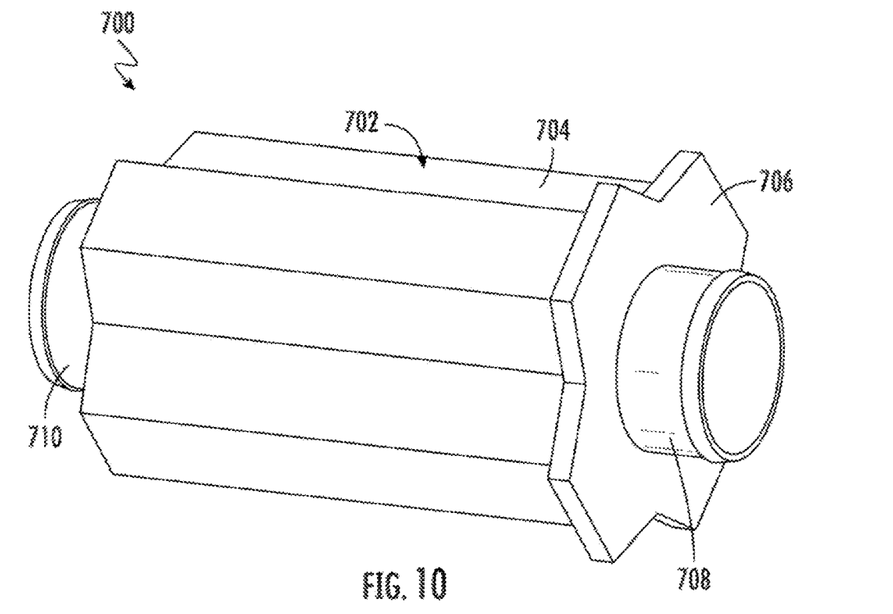
FIG. 10 is a side perspective view of a second example air filtration system.
Figure 11:
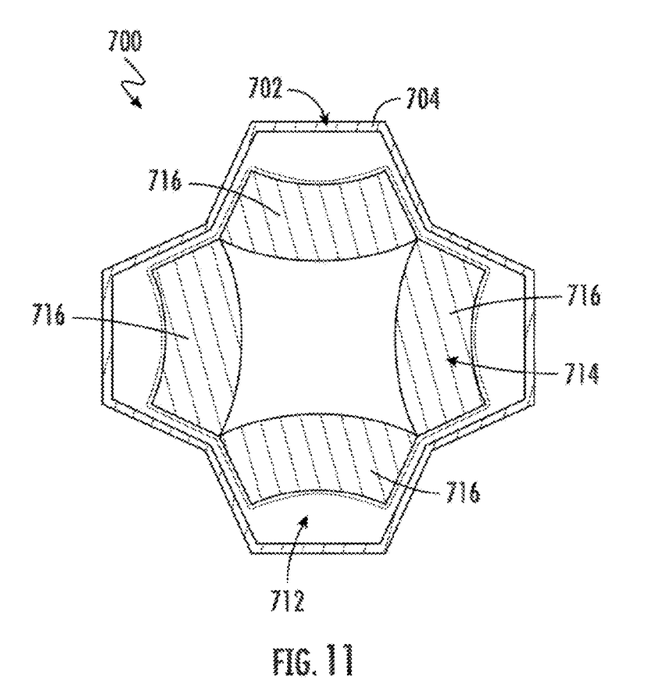
FIG. 11 is a front cross-sectional view of the air filtration system of FIG. 10.

Referring to FIGS. 10-13, another example filtration system 700 is shown that is configured to be used in an inside-out flow arrangement having an inner dirty side and an outer clean side. The filtration system 700 includes a housing 702 having a base 704 and a cover 706 detachably coupled to an axial end of the base 704. As shown in FIG. 10, the cover 706 includes a flow connection disposed centrally thereon and defining an inlet 708 for the filtration system 700. The base 704 also includes a flow connection, disposed at an opposite axial end of the housing 702 as the cover 706 and defining an outlet 710 for the housing 702. As shown in FIG. 11, the filter element 712 includes a media pack 714 formed from a plurality of media blocks 716. Each media block 716 is arched into a concave shape with the media blocks 716 bowing radially inward toward a central axis of the media pack 714. Beneficially, the concave shape and/or arrangement of the media blocks 716 in FIG. 11 improves strength under radial loading in an inside-out flow arrangement, and also provides a larger pleat pack surface with larger diameter on an upstream side (e.g., dirty side) of the media pack, where the pleats have greater pleat spacing with a larger volume between pleats to hold more dust and particulate matter.

Figure 12:
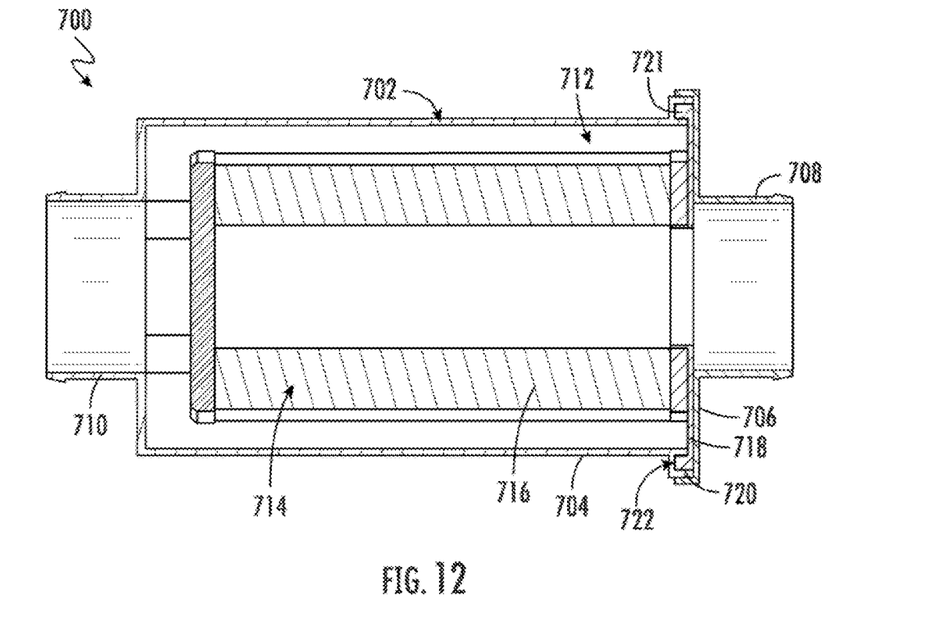
FIG. 12 is a side cross-sectional view of the air filtration system of FIG. 10.
Figure 13:
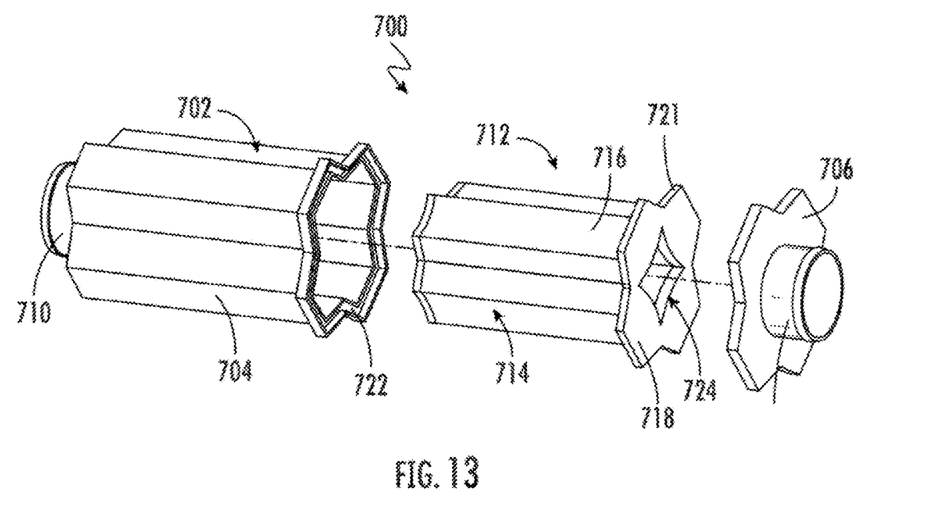
FIG. 13 is an exploded view of the air filtration system of FIG. 10.
Figure 14:
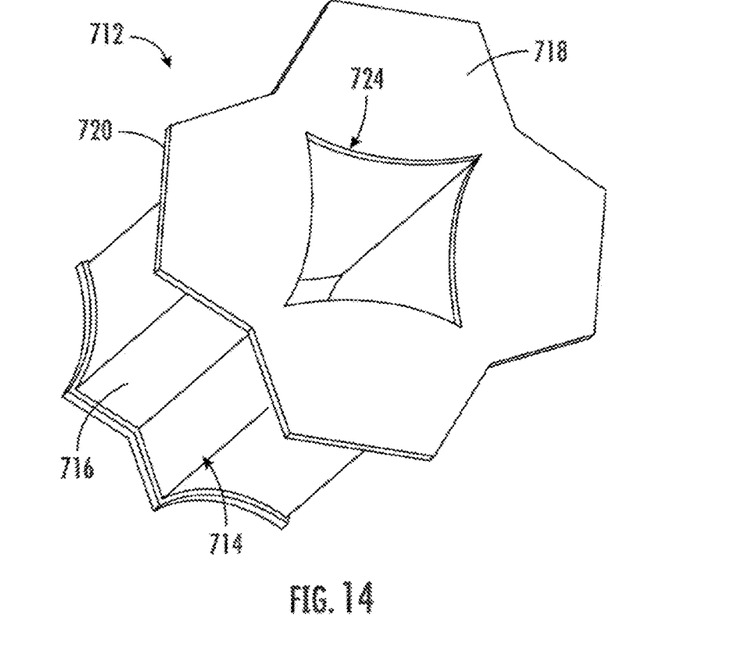
FIG. 14 is a front perspective view of a filter element for the air filtration system of FIG. 10.

As shown in FIG. 11, the filter element 712 is disposed within the housing 702 and is spaced radially apart from sidewalls of the base 704 so as to provide flow space for air to exit the media pack 714. In at least one embodiment, as shown in FIGS. 12-14, the filter element 712 includes an end cap 718 coupled to an axial end of the media pack 714 and extending radially beyond an outer perimeter of the media pack 714. As shown in FIG. 12, an outer perimeter 720 of the end cap 718 includes a lip 721 (e.g., flange, etc.) extending axially away from the outer perimeter 720 and engaging with a channel 722 defined along an open end of the base 704. The lip 721 is spaced radially apart from the media blocks 716. The end cap 718 (e.g., lip 721) is "sandwiched" or otherwise disposed between the base 704 and the cover 706, which supports the filter element 712 within the housing 702 and centers the filter element 712 within the housing 702. The end cap 718 is sealingly engaged with both the base 704 and the cover 706 at the lip 721 to prevent bypass between the clean and dirty sides of the filter element 712. In other embodiments, the housing 702 may include a support element, flange, and/or protrusion that engages the filter element 712 (e.g., end cap) to support the filter element 712 in position within the housing 702. As shown in FIGS. 13 and 14, the end cap 718 defines an opening 724 for the filter element 712 that is radially offset from an inner perimeter of the media pack 714 and has substantially the same shape as an inner perimeter of the media pack 714 (e.g., an asteroid shape, a hypocycloid with four cusps, a diamond shape with sides/edges curved radially inward toward a central axis of the media pack 714, etc.). In some embodiments, the end cap 718 defines a seal member for the end cap 718 with sealing surfaces oriented radially inward toward the central axis of the media pack 714.

Figure 15:
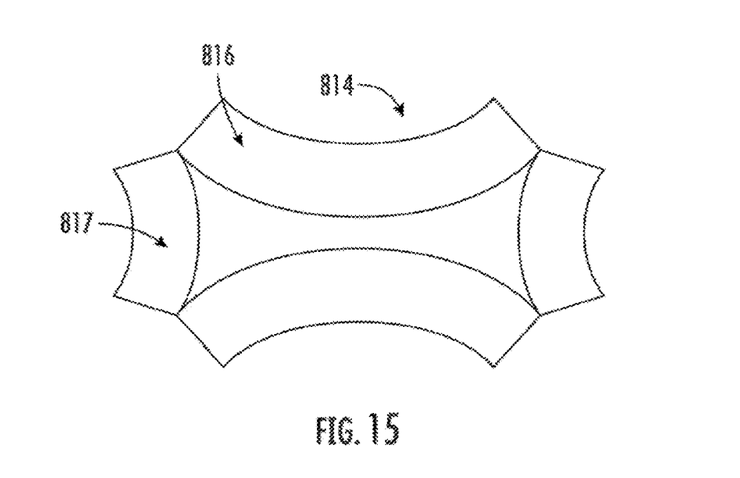
FIG. 15 is a front cross-sectional view of another example filter element.
Figure 16:
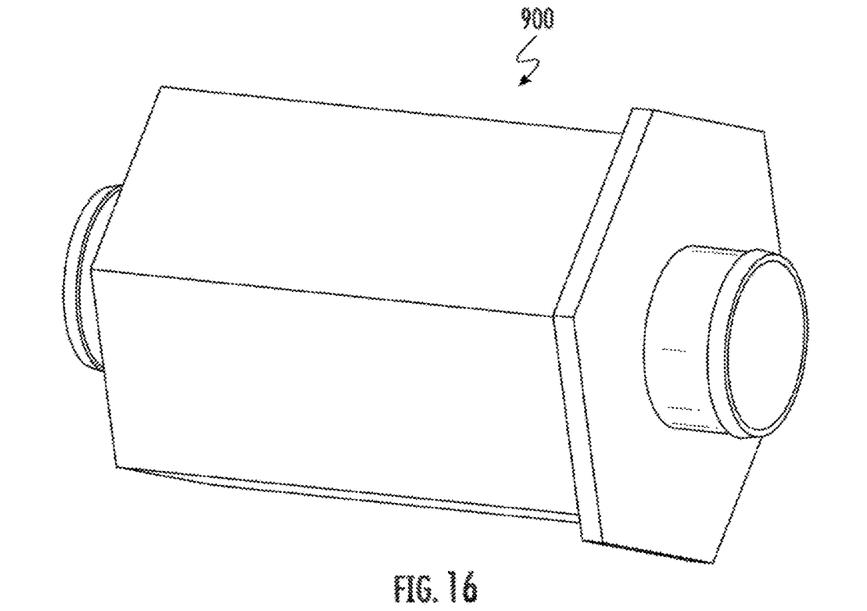
FIG. 16 is a side perspective view of a third example air filtration system.
Figure 17:
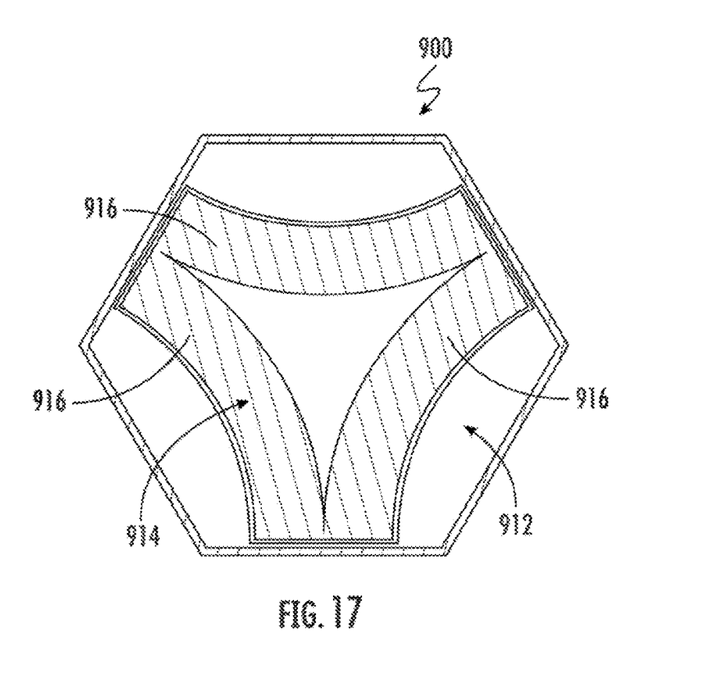
FIG. 17 is a front cross-sectional view of the air filtration system of FIG. 16.
Figure 18:
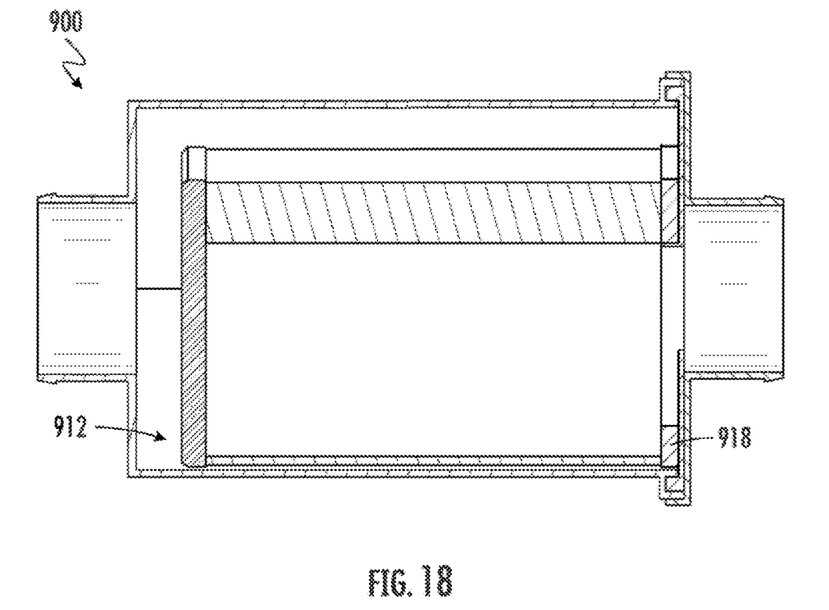
FIG. 18 is a side cross-sectional view of the air filtration system of FIG. 16.
Figure 19:
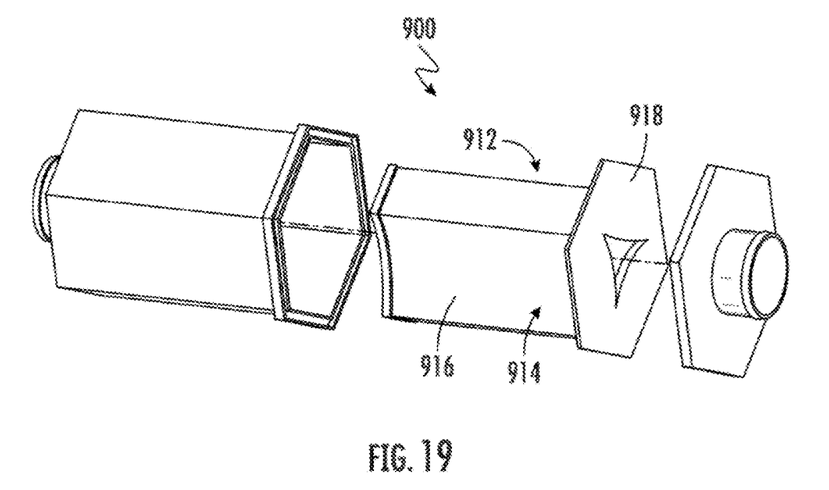
FIG. 19 is an exploded view of the air filtration system of FIG. 16.

In the embodiment of FIG. 11, the media pack 714 includes four media blocks 716 that are equal in length with an approximately equal inner and outer radius. However, in other embodiments, the size, shape, and/or arrangement of media blocks may be different. For example, FIG. 15 shows a cross-sectional view of a media pack 814 having four media blocks in which a first pair of media blocks 816 has a greater width than a second pair of media blocks 817. Beneficially, this arrangement may be used to accommodate a rectangular-shaped packaging volume.

Figure 20:
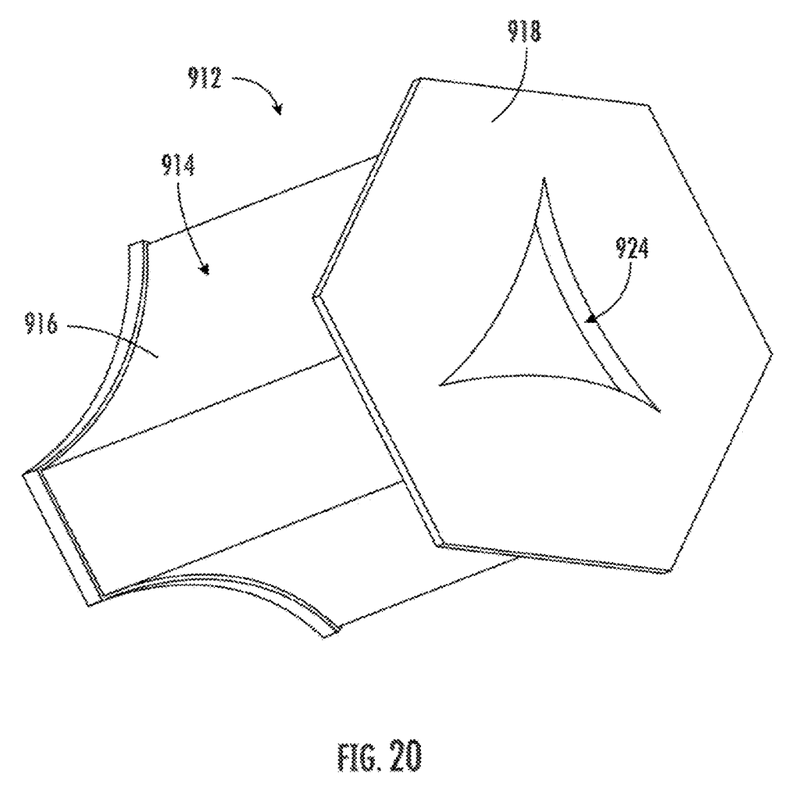
FIG. 20 is a front perspective view of a filter element for the air filtration system of FIG. 16.

Referring to FIGS. 16-19, another example embodiment of a filtration system 900 is shown. The filtration system 900 is similar to the filtration system 700 described with reference to FIGS. 10-13 but includes three media blocks 916 instead of four. Again, each media block is arched into a concave shape with the media blocks 916 bowing radially inward toward a central axis of the media pack 914. As shown in FIG. 20, the filter element 912 includes an end cap 918 that defines an opening 924 for the filter element 912 that is radially offset from an inner perimeter of the media pack 914 and has substantially the same shape as an inner perimeter of the media pack 914 (e.g., a triangular shape with sides/edges curved radially inward toward a central axis of the media pack 914). In one embodiment, the media pack 914 is formed from a single, continuous sheet of media (e.g., a single media panel). In other embodiments, each media block is formed from a separate media panel and the media blocks are connected in the corner regions to form the media pack.

III. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "approximately," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, or with the two components, or with the two components and any additional intermediate components being attached to one another.

The term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

What is claimed is:

1. A filtration system, comprising:
an air cleaner housing having a base and a removable cover, at least one of the base or the cover defining a cavity and a protrusion extending into the cavity; and
a filter element disposed within the cavity, the filter element comprising a plurality of media blocks each comprising a pleated filter media, the plurality of media blocks arranged in arch shapes of approximately equal inner radii, the plurality of media blocks coupled to each other along opposing edges that extend along a pleat direction of the pleated filter media, the media blocks together defining a void that extends along the protrusion, the protrusion occupying a portion of the void.

2. The filtration system of claim 1, wherein each of the plurality of media blocks is curved.

3. The filtration system of claim 1, wherein the at least one of the base or the cover comprises a curved outer wall, and wherein the protrusion is an indentation in the curved outer wall.

4. The filtration system of claim 1, wherein at least one of the base or the cover comprises a flow port that extends radially away from the air cleaner housing, the flow port arranged to direct air toward the void between media blocks.

5. The filtration system of claim 4, wherein the filter element further comprising a flow deflector disposed at least partially within the void between plurality of media blocks and adjacent to the flow port.

6. The filtration system of claim 1, wherein the protrusion is contoured to match a profile of the void, and wherein a distance between an interior surface of the air cleaner housing and the filter element at the protrusion is less than half of a pleat depth of the plurality of media blocks.

7. The filtration system of claim 1, wherein the plurality of media blocks is formed from a single continuous sheet of pleated media.

8. The filtration system of claim 1, wherein the plurality of media blocks includes at least three media blocks, and wherein a size of at least one of the plurality of media blocks is different from another one of the media blocks.

9. The filtration system of claim 1, wherein at least one media block of the plurality of media blocks has a first outer radius at a first axial end of the at least one media block and a second outer radius at a second axial end of the at least one media block that is larger than the first outer radius.

10. A filter element, comprising:
a plurality of media blocks each comprising a pleated filter media, the plurality of media blocks arranged in arch shapes of approximately equal inner radii, the plurality of media blocks coupled to each other along opposing edges that extend along a pleat direction of the pleated filter media, the plurality of media blocks together defining a void between adjacent media blocks;
a first end cap coupled to a first end of each one of the plurality of media blocks; and
a second end cap coupled to a second end of each one of the plurality of media blocks.

11. The filter element of claim 10, wherein each of the plurality of media blocks is curved.

12. The filter element of claim 10, wherein the plurality of media blocks together form an enclosed volume having an approximately lenticular-shaped cross-section.

13. The filter element of claim 10, wherein the plurality of media blocks together form an enclosed volume having an approximately vesica piscis-shaped cross-section.

14. The filter element of claim 10, wherein the plurality of media blocks together form a media pack that is symmetrical across a reference plane that extends along a central axis of the media pack.

15. The filter element of claim 10, wherein the plurality of media blocks together form a media pack, and wherein a shape of at least one of the first end cap or the second end cap matches a profile of an axial end of the media pack.

16. The filter element of claim 10, wherein the void is a channel that extends along an entire axial length of the filter element.

17. The filter element of claim 10, wherein the first end cap comprises an opening and a seal member circumscribing the opening, the seal member comprising a first set of surfaces defining a first set of arches, and a second set of surfaces defining a second set of arches having a smaller radius than the first set of arches.

18. The filter element of claim 10, wherein a ratio of a radius of the first set of arches over a radius of the second set of arches is within a range between 5 and 100.

19. The filter element of claim 10, wherein the media blocks are each arched into a convex shape that curves radially away from a central axis of the filter element.

20. The filter element of claim 10, wherein the media blocks are each arched into a concave shape that curves radially inward toward a central axis of the filter element.

21. The filter element of claim 10, wherein the first end cap comprises a lip disposed along an outer perimeter of the first end cap, the lip spaced radially apart from the plurality of media blocks and extending axially away from the outer perimeter of the first end cap.

* * * * *